US006735009B2

(12) United States Patent
Li

(10) Patent No.: US 6,735,009 B2
(45) Date of Patent: May 11, 2004

(54) ELECTROPTIC DEVICE

(75) Inventor: Zili Li, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 146 days.

(21) Appl. No.: 10/195,907

(22) Filed: Jul. 16, 2002

(65) Prior Publication Data
US 2004/0012836 A1 Jan. 22, 2004

(51) Int. Cl.[7] .......................... G02F 1/03; G02F 1/1335; G02F 1/1347; G09G 3/36; G11B 7/00
(52) U.S. Cl. ..................... 359/245; 359/254; 349/18; 349/74; 349/75; 349/97; 349/115; 349/118; 349/119; 345/87; 345/94; 345/104; 365/108; 369/100
(58) Field of Search ................. 359/245, 254, 359/487; 349/18, 74, 75, 97, 106, 115, 117, 118, 119, 185; 345/87, 94, 104; 365/108; 369/100

(56) References Cited

U.S. PATENT DOCUMENTS

| 5,243,451 | A | * | 9/1993 | Kanemoto et al. | 349/75 |
| 5,353,247 | A | * | 10/1994 | Faris | 365/108 |
| 5,430,462 | A | * | 7/1995 | Katagiri et al. | 345/104 |
| 6,025,899 | A | * | 2/2000 | Fukunaga et al. | 349/115 |
| 6,300,929 | B1 | * | 10/2001 | Hisatake et al. | 345/94 |
| 6,580,482 | B1 | * | 6/2003 | Hiji et al. | 349/115 |

FOREIGN PATENT DOCUMENTS

JP   2001083485   *   3/2001

OTHER PUBLICATIONS

Kawata, Y. et al, *A Highly Reflective LCD with Double Cholestreic Liquid Crystal Layers*, International Display Research Conference on Sep. 17th, 1997.
Blinov, L.M., *Electro–Optical and Magneto–Optical Properties of Liquid Crystals*, 1983 p 240–250.
Meyer, R.B., *distortion of a cholesteric structure by a magnetic field*, applied physics letters, vol. 14, No. 7 (Apr. 1, 1969) pp 208–209.
Kahn, F.J., *Electric Field Induced Color Changes And Pitch Dilation In Cholesteric Liquid Crystals*, Physical Review Letters, vol. 24, No. 5 (Feb. 2, 1970), pp. 209–212.

* cited by examiner

*Primary Examiner*—Loha Ben

(57) ABSTRACT

Electrooptic devices (100, 600, 700) include a left handed (102, 708) and right handed (104, 710) cholesteric phase liquid crystal layers. Electrodes (120, 122, 124, 126, 602, 604) or magnetic coils (704, 706) are used to apply electric or magnetic fields perpendicular to helical axes of the cholesteric phase liquid crystal layers. The fields lengthen the helical pitch of the liquid crystal layers thereby shifting the reflectance of the liquid crystal layers to longer wavelengths. Spectral reflectance of both left and right hand polarized light is controlled by the electrooptic devices.

16 Claims, 5 Drawing Sheets

ELECTROPTIC DEVICE

FIELD OF THE INVENTION

The present invention relates in general to electrooptic devices. More particularly, the present invention relates to devices for switching and/or selectively filtering light signals.

DESCRIPTION OF RELATED ART

In recent decades, land line communications including voice and data networks have shifted from electrical transmission mediums such as twisted pairs to optical fiber transmission mediums. As this trend continues there is an interest reducing the reliance on electrical signal processing within networks, with an ultimate goal of employing all-optical networks.

One type of component that is useful in optical networking is an optical cross connect. Optical cross connects are used to selectively connect light signals received at an input to one of a plurality of signal outputs.

Microelectromechanical system (MEMS) type optical interconnects that use moveable mirrors have been used. However the manufacture of such devices is costly and complex. Furthermore MEMS reliability is of concern.

Another type of optical interconnect that is based on an adaptation of ink jet technology has also been proposed. However, such interconnects are also quite complex.

Apart from the field of communication, there are various uses of optical filters, including for example for spectroscopy, optical remote sensing, optical lithography, and photochemistry. One of the more widely used types of precision optical filter employs a multi-layer stack of thin solid dielectric films. The spectral characteristics such as spectral reflectance and spectral transmittance of multi-layer thin film filters are determined by the number of layers thickness of each layer and index of refraction of each layer. The fabrication of such filters ordinarily involves time consuming and costly deposition processes.

BRIEF DESCRIPTION OF THE FIGURES

The present invention will be described by way of exemplary embodiments, but not limitations, illustrated in the accompanying drawings in which like references denote similar elements, and in which.

DETAILED DESCRIPTION OF THE PREFERRED EMBODIMENTS

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Figure 1:
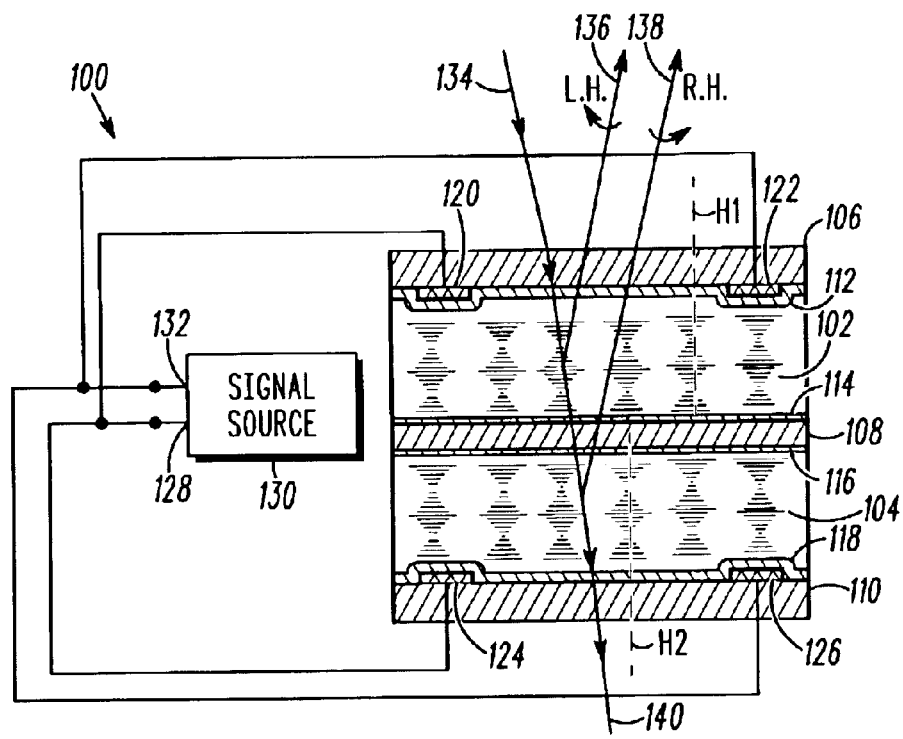
FIG. 1 is a fragmentary sectional elevation view of an electrooptic device according to the preferred embodiment of the invention, shown in a first state.

FIG. 1 is a fragmentary sectional elevation view of an electrooptic device 100 according to the preferred embodiment of the invention, shown in a first state. The electrooptic device 100 includes a left handed cholesteric phase liquid crystal layer 102, and a right handed cholesteric phase liquid crystal layer 104. (Although in its original use cholesteric, as applied to liquid crystal materials, denoted a certain chemical structure; currently, and as used in this description, the term denotes a certain phase of liquid crystal material.) The left handed cholesteric phase liquid crystal layer 102 is located between a first transparent wall 106 and a second transparent wall 108. Similarly the right handed cholesteric phase liquid crystal layer 104 is located between the second transparent wall 108 and a third transparent wall 110. The left handed cholesteric phase liquid crystal layer 102 is optically coupled to the right handed cholesteric phase liquid crystal layer 104. As shown in FIG. 1, according to the preferred embodiment, the cholesteric phase liquid crystal layers 102, 104 are optically coupled by being in direct line of sight of each other. According to alternative embodiments, the cholesteric phase liquid crystal layers 102, 104 are optically coupled by optical fibers, mirrors, lens or other optical elements.

A first alignment layer 112 is supported on the first transparent wall 106 facing the left handed cholesteric phase liquid crystal layer 102, and a second alignment layer 114 is supported on the second wall 108 also facing the left handed cholesteric layer 102. Similarly a third alignment layer 116 is supported on the second transparent wall 108 facing the right handed cholesteric liquid crystal layer 104, and a fourth alignment layer 118 is supported on the third transparent wall 110 facing the right handed cholesteric liquid crystal layer 104. The four alignment layers 112, 114, 116, 118 serve to promote and stabilize the cholesteric phase of the left and right handed cholesteric phase liquid crystal layers 102, 104. The four alignment layers 112, 114, 116, 118 preferably comprise a rubbed polymer, e.g. polyimide. The alignment layers that contact each of the liquid crystal layers 102, 104, are preferably rubbed in opposite directions. Alternatively, only one alignment layer is used for each cholesteric phase liquid crystal layer 102, 104.

A first electrode 120, and a second electrode 122 are arranged spaced apart on the first transparent wall 106. The first alignment layer 112 covers the first and second electrodes 120, 122. Similarly, a third electrode 124, and a fourth electrode 126 are arranged spaced apart on the third transparent wall 110. The first electrode 120 and the third electrode 124 are coupled to a first pole 128, of a signal source 130. Similarly, the second electrode 122 and the fourth electrode 126 are coupled to a second pole 132 of the signal source 132. The aforementioned connection ensures that the same signal is applied to both liquid crystal layers 102, 104. The area of the first wall that is horizontally between the first 120, and the second 122 electrodes, is free of conductive or other light blocking materials.

The two cholesteric phase liquid crystal layers 102, 104 used in the electrooptic device 100 are characterized by opposite handedness, however, there is no preference as to which is on top and which is on bottom.

The left handed cholesteric phase liquid crystal layer 102 comprises a plurality of layers of liquid crystal molecules. Each layer of molecules includes a plurality of substantially parallel elongated liquid crystal molecules. The layers of molecules are stacked one on top of another. The layers of molecules are stacked along an axis H1. The liquid crystal molecules in each successive layer of molecules are rotated by a small angular increment relative to molecules in an adjacent layer of molecules. The rotation of molecules in successive layers is a rotation about the axis H1. The rotation of molecules in successive layers about the axis H1, as a function of position along the axis H1, describes a helix that is characterized by a helical pitch. Thus, one refers to a pitch of a cholesteric phase liquid crystal material although the liquid crystal does not include helical molecules. Similarly, the right hand cholesteric liquid crystal layer 104 is characterized by an axis H2. The cholesteric phase of the left and right handed cholesteric phase liquid crystal layers 102, 104 is such that the helical axes H1, H2 are preferably arranged substantially perpendicular to the three transparent walls 106, 108, 110. Consequently, the helical axes H1, H2 of the liquid crystal layers 102, 104 are substantially parallel to each other as well. The left handed cholesteric phase liquid crystal layer is said to be left handed in as much as if an imagined left hand were positioned with fingers wrapped around the axis H1, and thumb extended along the axis H1, and if one were to consider successive layers of liquid crystal molecules proceeding in the direction pointed by the thumb, the molecules in the successive layers would rotate in the same direction pointed to by the fingers of the left hand curled around the axis H1.

The right handed cholesteric phase liquid crystal 104 also comprises a stack of layers of liquid crystal molecules. The direction of rotation of successive layers of the right handed cholesteric phase liquid crystal 104 is opposite to that of the left handed cholesteric phase liquid crystal layer 102, and about the axis H2.

The cholesteric phase liquid crystal layers 102, 104 preferably comprise a base of nematic (non-chiral) liquid crystal molecules, along with a chiral dopant. The chiral dopant is responsible for the liquid crystal layers 102, 104 assuming the cholesteric phase.

Referring again to FIG. 1, the operation of the electrooptic device will be described. In FIG. 1, an incident pencil of light is represented by a ray 134. The incident pencil of light can be a collimated beam, for example a mode emitted by a laser resonator, or can be a somewhat divergent or convergent beam such as emanated from an end of an optical fiber or output by an optical train (not shown). In certain applications the incident pencil of light includes a broadband of spectrum, for example white light. On the other hand, in other applications, the incident pencil of light includes a relatively narrow spectrum of light, such as a single atomic emission line, or laser light.

In the state represented in FIG. 1, the signal source is turned off so that no voltage is applied to the four electrodes 120, 122, 124, 126. Under the latter condition the cholesteric phase liquid crystal layers 102, 104 are characterized by a natural helical pitch. In FIG. 1 and FIGS. 2, 6, 7 described herein below, the cholesteric phase liquid crystal layers 102, 104 are represented using a plurality of vertically arranged series of horizontal lines. The lengths of the lines vary as a function of vertical position. Such a representation denotes the apparent variation of length of liquid crystal molecules rotated according to the helical pitch, as seen from a fixed vantage point.

As shown in FIG. 1, a first pencil of reflected light is represented by a first reflected ray 136. The first pencil of reflected light 136 is reflected by the left handed cholesteric liquid crystal layer 102 and is characterized by a left handed circular polarization. A second pencil of reflected light is represented by a second ray 138. The second pencil of reflected light 138 is reflected by the right handed cholesteric liquid crystal layer and is characterized by a right handed circular polarization. (Note that although the first and second reflected rays 136, 138 are schematically illustrated as reflected at discrete points, reflection by the cholesteric layers 102, 104 is in fact a physical optics effect that is not localized at discrete points.)

If the left and right handed cholesteric liquid crystal layers 102, 104 are of sufficient thickness equal for example to at least about 10 times their natural pitch then substantially all of the light in the incident pencil 134 is reflected. The height of the left and right handed cholesteric liquid crystal layers 102, 104 are preferably at least about 10 times their natural (zero field) pitches. Also the height of the cholesteric liquid crystal layers 102, 104, corresponding to the separation of the walls 106, 108, 110 is preferably in the range of five to twenty microns.

The helical pitches that characterize the left and right handed cholesteric liquid crystal layers 102, 104 are preferably equal. The pitches can be controlled by controlling the amounts of chiral dopant included in the liquid crystal layers 102, 104. Light that is reflected into the first and second pencils of reflected light 136, 138 includes a spectral band that is centered at a wavelength that is, to first order approximation, given by:

$$\lambda = nP\cos(\theta), \qquad (\text{EQU. 1})$$

where, n is the average index of refraction of the left or right handed liquid crystal layers;

P is the helical pitch that characterizes the left or right handed liquid crystal layers, and theta is the angle of light propagating within the liquid crystal relative to the helical axis of the liquid crystal.

The bandwidth of the reflection band is, to first order approximation, given by:

$$\Delta\lambda = \Delta nP\cos(\theta) \qquad (\text{EQU. 2})$$

where, $\Delta n$ is the difference between the index of refraction measured parallel and perpendicular to elongated liquid crystal molecules of the cholesteric phase liquid crystal layers 102, 104; and P and theta are defined above.

A pencil of transmitted light is represented by a transmitted ray 140. The transmitted ray 140 includes spectral components that are present in the incident pencil of light and are substantially absent from the first and second reflected pencils of light.

Figure 2:
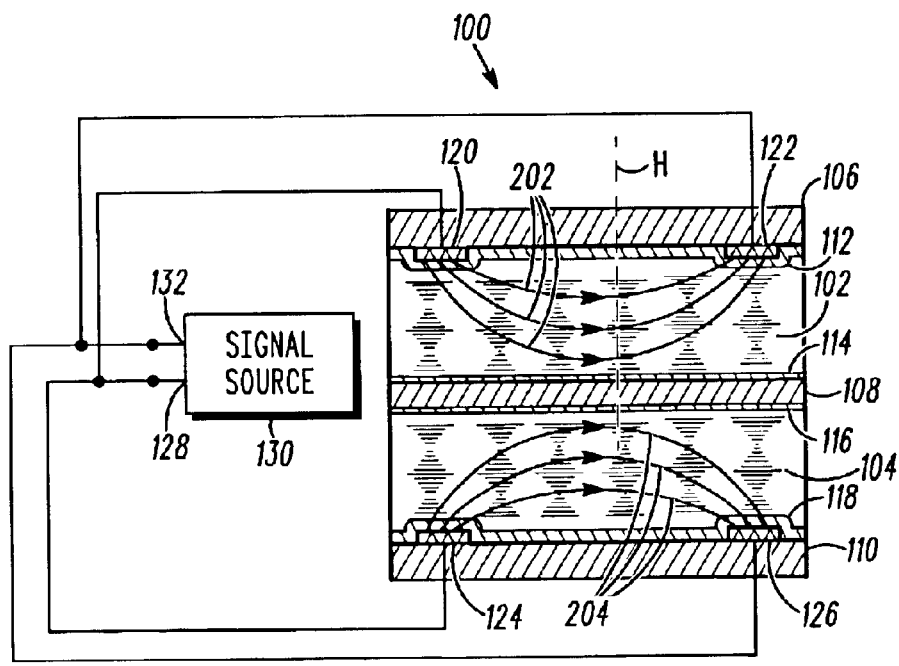
FIG. 2 is a fragmentary sectional elevation view of the electrooptic device shown in FIG. 1 in a second state.

FIG. 2 is a fragmentary sectional elevation view of the electrooptic device 100 shown in FIG. 1 in a second state. To obtain the second state, illustrated in FIG. 2, the signal source 130 is operated to output a voltage signal. The voltage signal is applied between the first electrode 120 and the second electrode 122, and is also applied between the third electrode 124, and the fourth electrode 126. The voltage signal applied between the first 120 and second 122 electrodes, establishes a first electric field 202 in the left handed cholesteric phase liquid crystal layer 102. Similarly, the voltage signal applied between the third 124 and fourth 126 electrodes establishes a second electric field 204 in the right handed cholesteric phase liquid crystal layer 104. The voltage signal is preferably a DC signal or an AC signal at a frequency at which the cholesteric phase liquid crystal layers 102, 104 exhibit a positive dielectric anisotropy. Dielectric anisotropy is the difference between the relative permittivity measured parallel to the axes of elongated molecules that make up the cholesteric phase liquid crystal of the layers 102, 104, and the relative permittivity measured perpendicular to the axes of the molecules.

The first and second electric fields 202, 204 preferably include substantial field components perpendicular to the helical axes H of the left 102, and right 104 cholesteric phase liquid crystal layers. Note that the height dimension of the electrooptic device 100 is exaggerated in FIGS. 1, 2 in the interest of clarity. The separation of the first 120 and second 122 electrodes and the separation of the third 124 and fourth 126 electrodes is, in fact, preferably large compared to the heights of the first 102, and second 104 cholesteric phase liquid crystal layers, for example three times as large, so that the electric fields 202, 204, are in fact perpendicular to the helical axes H, to a greater extent than illustrated. Due to the great difference in the heights of the walls 106, 108, 110 and the liquid crystal material layers 102, 104, these elements are not drawn to scale.

Due to the positive dielectric anisotropy of the first 102, and second 104 cholesteric phase liquid crystal layers, it is energetically more favorable for the elongated molecules of the liquid crystal layers 102, 104 to align with the electric fields 202, 204. Consequently, application of the electric fields 202, 204 leads to an effective elongation of the pitches of the helices that characterize the orientation of molecules within the liquid crystal layers 102, 104. The elongation of the pitch alters the center wavelength, and bandwidth of the spectral band of light reflected by electrooptic device 100. The dependence of the center wavelength and bandwidth of the spectral band are quantified to first order approximation by equation one and equation two above. Thus, the electrooptic device 100, provides for electrically controllable spectrally selective reflection and transmission of incident light. Although a particular theoretical explanation of the operation of the electrooptic device 100 has been put forth, the invention should not be construed as limited to a particular theoretical explanation.

Figure 3:
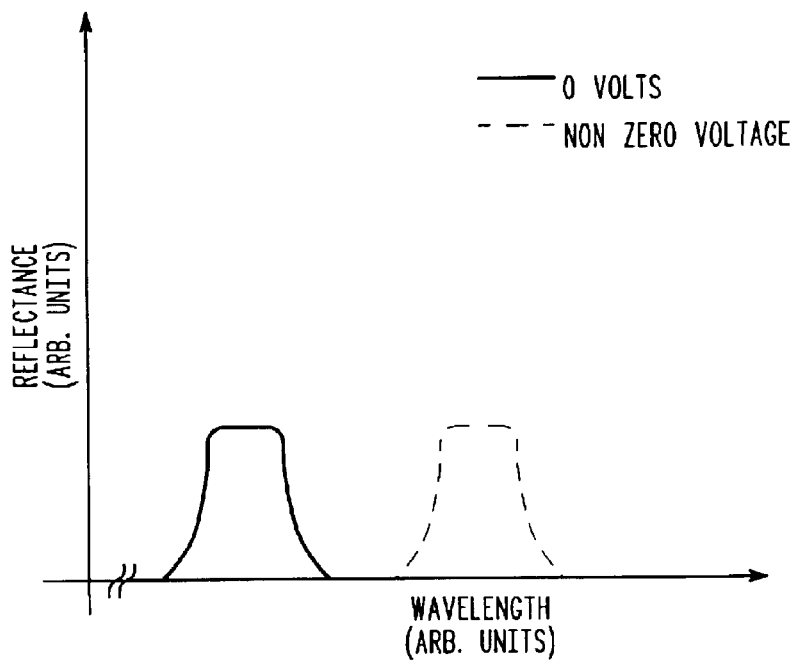
FIG. 3 is a graph of reflectance versus wavelength for the electrooptic device shown in FIGS. 1, 2, that includes plots for the first and second states.

FIG. 3 is a graph of reflectance versus wavelength for the electrooptic device shown in FIGS. 1, 2, that includes plots for the first and second states. The plot for the first state is shown by a solid line, and the plot for the second state is shown by a dashed line. Note that by applying a voltage signal, to change the electrooptic device 100 to the second state the reflection band is shifted to longer wavelengths. Providing both the left 102 and the right 104 handed cholesteric phase liquid crystal layers, allows reflectance above 50% to be achieved for unpolarized incident light.

Figure 4:
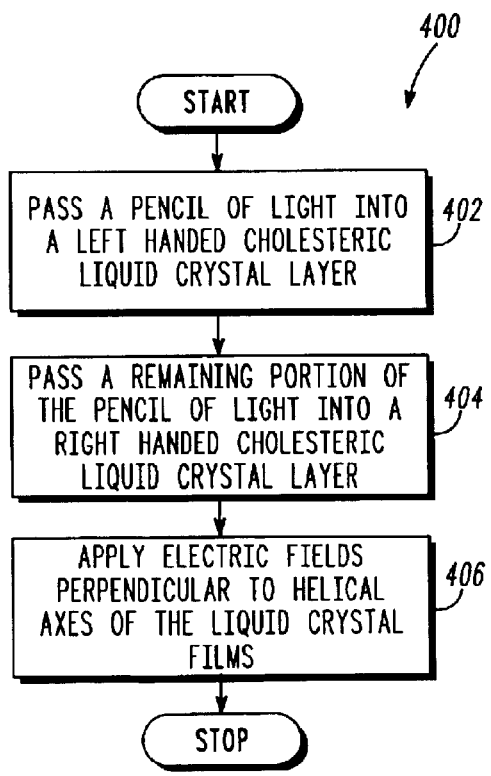
FIG. 4 is a flow chart of a method of modulating light according to the preferred embodiment of the invention.

FIG. 4 is a flow chart of a method 400 of modulating light according to the preferred embodiment of the invention. In step 402 a pencil of light is passed into the left handed cholesteric phase liquid crystal layer 102. In step 404 a remaining portion of the pencil of light (what remains after reflection by the left handed cholesteric phase liquid crystal layer 102) is passed into the right handed cholesteric phase liquid crystal layer 104. In step 406 electric fields 202, 204 are applied perpendicular to the helical axes of the liquid crystal layers 102, 104, in order to control the spectrally selective reflection of the incident pencil of light. Note that the order of steps 402, and 404 is alternatively interchanged, and step 406 is preferably performed concurrently with steps 402, 404.

Figure 5:
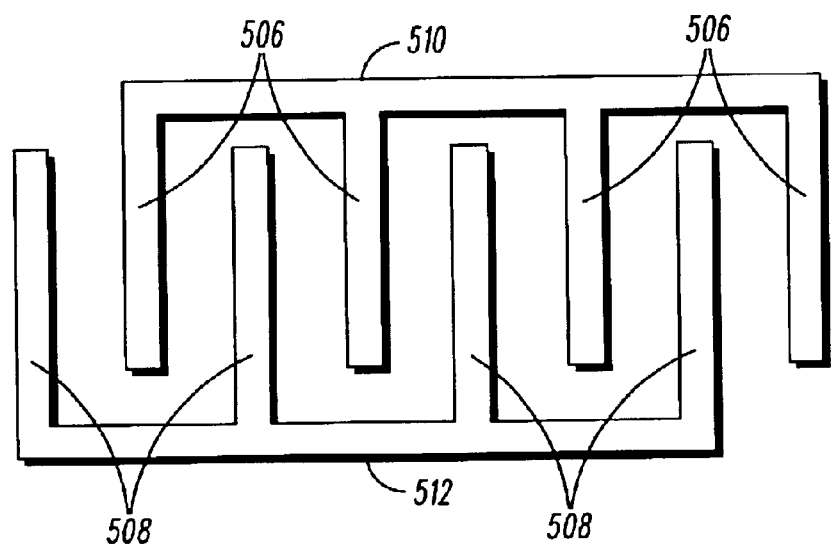
FIG. 5 is a plan view of drive electrodes for the electrooptic device shown in FIGS. 1,2 according to a first alternative embodiment of the invention.

FIG. 5 is a plan view of two drive electrodes 502, 504 for the electrooptic device shown in FIGS. 1,2 according to a first alternative embodiment of the invention. A fifth electrode 502 includes a first bus line 510, and a first plurality of parallel fingers 506 that extend from the first bus line 510. A sixth electrode 504 includes a second bus line 512 that is substantially parallel to the first bus line 510 of the fifth electrode 502, and includes a second plurality of parallel fingers 508 that extend from the second bus line 512 toward the first bus line 510 of the fifth electrode 502. The first plurality of fingers 506 are interdigitated with the second plurality of fingers 508. The fifth and sixth electrodes 502, 504 shown in FIG. 5 are alternatively used in lieu of the first 120, and second 122 electrodes shown in FIGS. 1, 2. An identical set of the fifth and sixth electrodes 502, 504 is alternatively used in lieu of the third 124, and fourth 126 electrodes shown in FIGS. 1, 2. Using the fifth and sixth electrodes 502, 504 allows an electric field to be established over a large area of the liquid crystal layers 120, 122 without requiring a high voltage signal.

Figure 6:
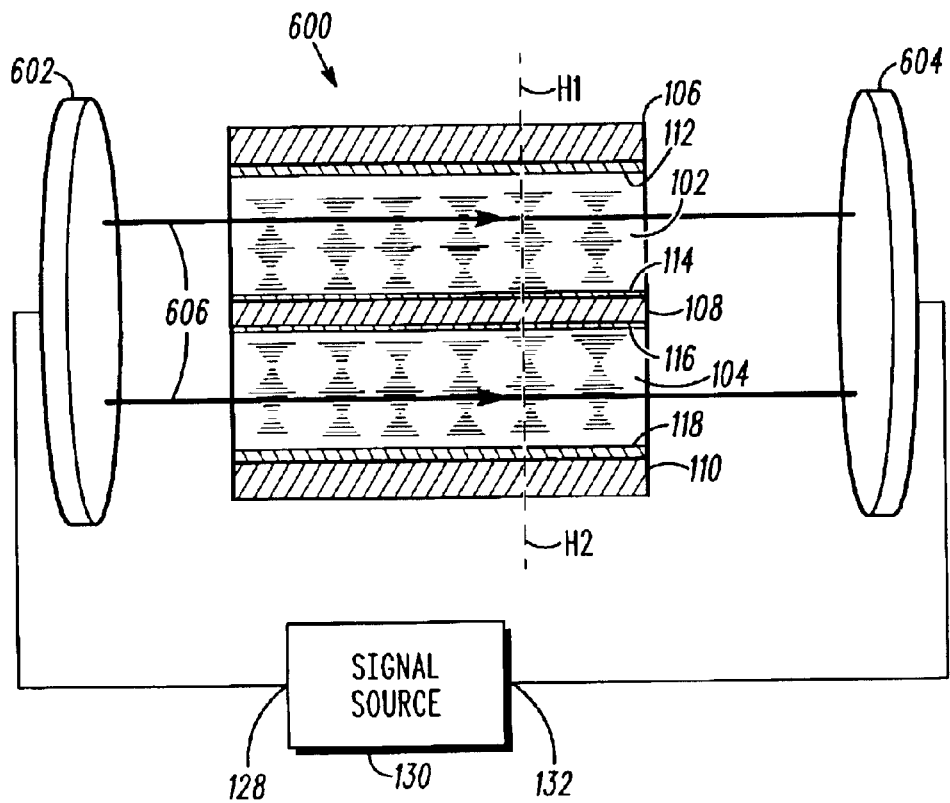
FIG. 6 is a partial section elevation view of an electrooptic device according to a second alternative embodiment of the invention.

FIG. 6 is a partial section elevation view of an electrooptic device 600 according to a second alternative embodiment of the invention. In contrast to the preferred embodiment shown in FIGS. 1,2, or the first alternative embodiment that includes the electrodes shown in FIG. 5, the second alternative embodiment shown in FIG. 6 uses two opposed external electrodes 602, 604, that are positioned on opposite sides of the electrooptic device 600. The first pole 128 of the signal source 130 is coupled to a first external electrode 602 that is located at the left of the second alternative electrooptic device 600. The second pole 132 of the signal source 130 is coupled to a second external electrode 604 that is located at the right of the second alternative electrooptic device 600. The two external electrodes 602, 604 are used to establish an electric field 606 in both the cholesteric phase liquid crystal layers 102, 104.

Figure 7:
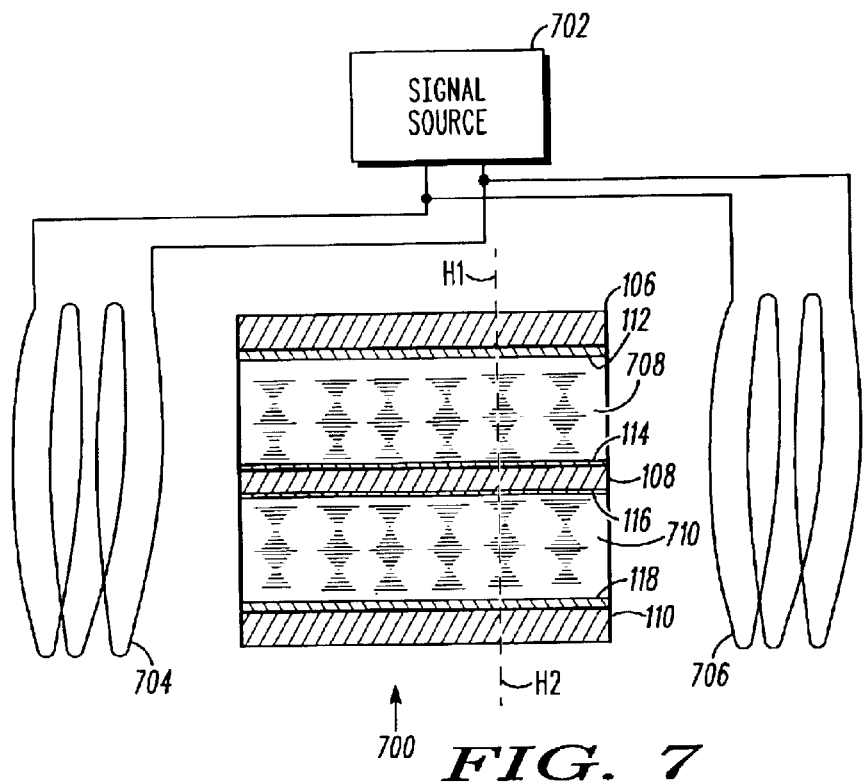
FIG. 7 is a partial sectional elevation view of an electrooptic device according to a third alternative embodiment of the invention.

FIG. 7 is a partial sectional elevation view of an electrooptic device 700 according to a third alternative embodiment of the invention. The third alternative electrooptic device 700 uses a left handed cholesteric phase liquid crystal layer 708 that exhibits a positive magnetic anisotropy and a right handed cholesteric phase liquid crystal layer 710 that also exhibits a positive magnetic anisotropy. The positive anisotropy of the liquid crystal layers 708, 710 is exhibited in at least a finite frequency range that can include zero (DC field).

A current signal source 702 is coupled to a first magnetic field coil 704 and a second magnetic field coil 706. The first 704 and second 706 magnetic field coils are positioned and oriented so as to establish a magnetic field perpendicular to helical axes H of the left and right handed cholesteric phase liquid crystal layers 708, 710. The current source 702 is capable of outputting a signal at a frequency at which the liquid crystal layers 708, 710 exhibit positive diamagnetic anisotropy.

In response to magnetic fields set up by the first and second magnetic field coils 704, 706 helical pitches, or preferably a single helical pitch that characterizes the liquid crystal layers 708, 710 is increased, and the spectral reflectance band of the of the electrooptic device 700 is shifted to longer wavelengths.

Figure 8:
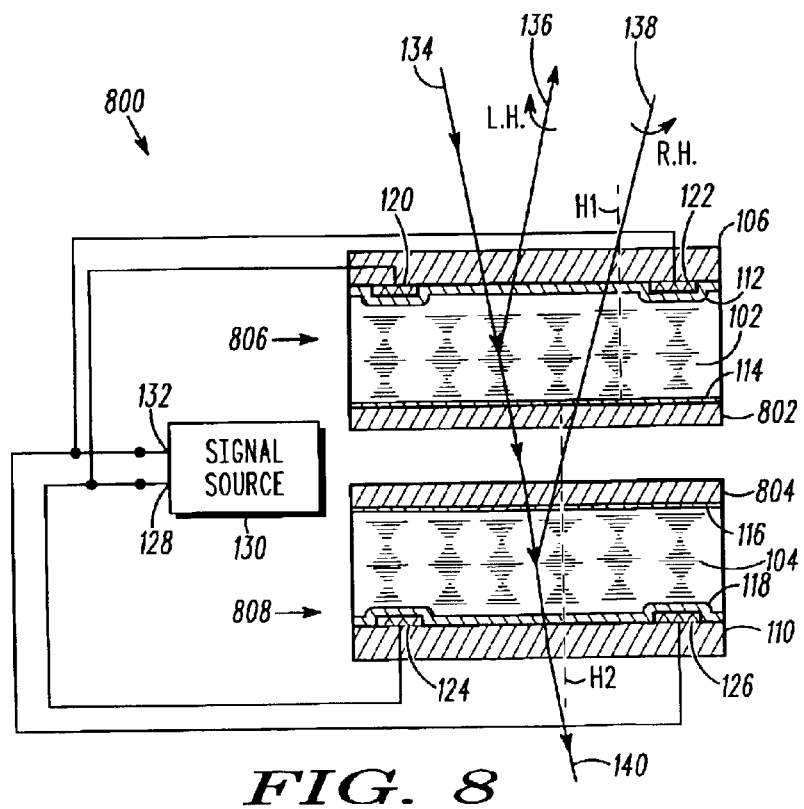
FIG. 8 is a partial sectional elevation view of an electrooptic device according to a fourth alternative embodiment of the invention.

FIG. 8 is a partial sectional elevation view of an electrooptic device 800 according to a fourth alternative embodiment of the invention. The fourth alternative electrooptic device 800 differs from the preferred embodiment 100 in that a fourth wall 802, and a fifth wall 804 are used in lieu of the second wall 108 of the preferred embodiment 100. Thus, the fourth alternative electrooptic device 800 comprises a first cell 806 and a second cell 808 that separately enclose the left 102 and right 104 handed cholesteric phase liquid crystal layers. The left handed cholesteric phase layer 102 is contained in the a first cell 806 between the first wall 106 and a fourth wall 802, and the right hand cholesteric phase layer is contained in the second cell 808 between the fifth wall 804 and the third wall 110.

Figure 9:
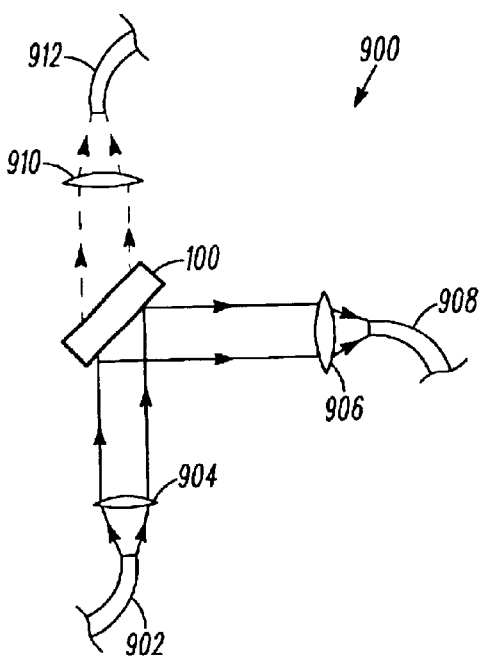
FIG. 9 is a schematic plan view of a one-by-two optical cross connect according to the preferred embodiment of the invention.

FIG. 9 is a schematic plan view of a one-by-two optical cross connect 900 according to the preferred embodiment of the invention. The cross connect 900 includes the electrooptic device 100 shown in FIG. 1. Alternatively, the electrooptic devices shown in FIGS. 2 and 7 are used. Referring to FIG. 9, an optical input 902 takes the form of a first optical fiber end. Light emanating from the optical input 902 is collimated by a collimating lens 904, and projected on the electrooptic device 100. As illustrated, light is incident on the electrooptic device 100 at a forty-five degree angle. Alternatively other angles of incidence are used. In the state shown signals are applied to shift the spectral reflectance band of the electrooptic device 100 to at least partially overlap a spectrum of light emanating from the optical input 902. Light within the spectral reflectance band is therefore reflected by the electrooptic device 100, changes course by ninety degrees, and impinges a first focusing lens 906. The first focusing lens 906 focuses the light on a first optical output 908 that takes the form of an end of a second optical fiber.

Dashed ray lines illustrate the path of light, that is not reflected by the electrooptic device 100. Such transmitted light impinges a second focusing lens 910, and is focused by the second focusing lens 910 onto a second optical output 912 that takes the form of an end of a third optical fiber.

The nature of the operation of the cross connect 900 can vary. If the bandwidth of light received at the optical input 902 is greater than the bandwidth of reflection band of the electrooptic device 100, then the cross connect 900 can be used to selectively control which sub-band of the input light is switched to which of the two outputs 908, 912. On the other hand if the bandwidth of received light is less than the bandwidth of the reflection band of the electrooptic device 100, the cross connect is used to determine which of the two outputs 908, 912 receives light from the input 902.

Rather than using the lens 904, 906, 910 other types of optical elements or optical trains including lens and/or other types of optical elements are used. Rather than using optical fibers other types of optical input 902, and optical outputs 908, 912 are used. The input 902 can take the form of an optical source, e.g., a laser. The outputs 908, 910 can take the form of photodetectors.

Figure 10:
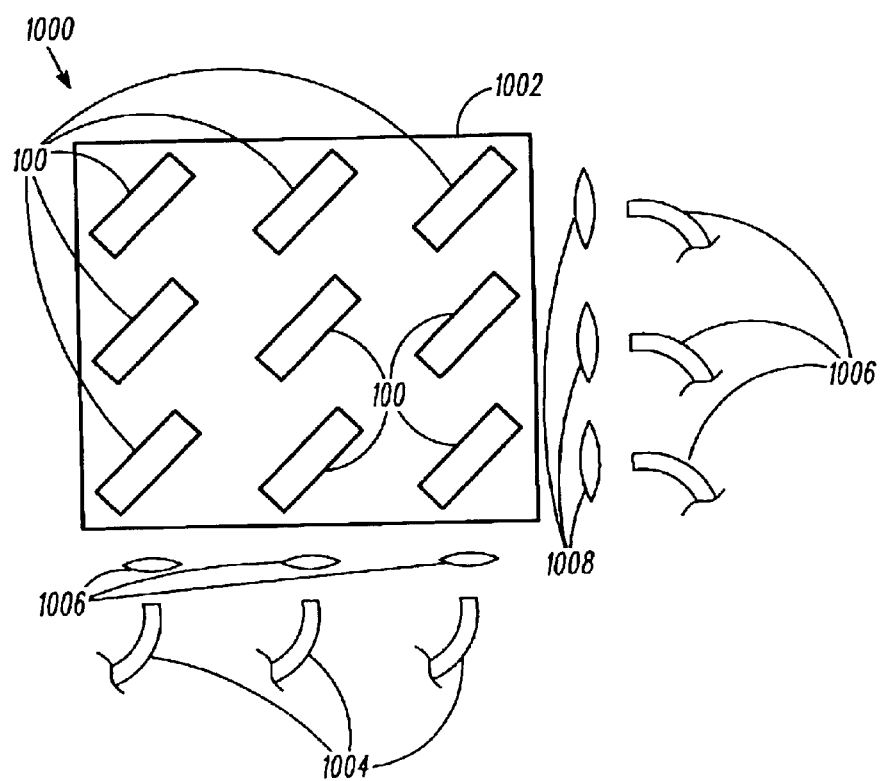
FIG. 10 is a schematic plan view of view of a three-by-three optical cross connect according to an alternative embodiment of the invention.

FIG. 10 is a schematic plan view of view of a three-by-three optical cross connect 1000 according to an alternative embodiment of the invention. The three by three optical cross connect comprises a square three-by-three array 1002 of electrooptic devices of the type shown in FIG. 1. Alternatively, one of the electrooptic devices shown in FIGS. 6, 7 and 8 is used. Three optical inputs 1004 are provided. Each of the optical inputs 1004 is provided with one of three collimating lenses 1006. Each of the collimating lenses 1006 directs light from its associated input 1004 along a path (vertical) that would intercept three of the electrooptic devices at a forty five degree angle. The distance that the light from each input 1004 reaches along the aforementioned paths does of course depend on the state of the electrooptic devices 100. At the side of the array 1002, positioned at ninety degrees relative to the inputs 1004, are three optical outputs 1006. The three optical outputs 1006 are provided with focusing lenses 1008.

By setting the state of three of the electrooptic devices 100 (one from each column, and one from each row) in the array 1002 to be reflective of light emanating from thin inputs 1004, light from each of the inputs 1004 is directed to a selected output 1006 among the outputs 1006. Thus, light can be selectively coupled from each of the inputs 1004 to one of the three outputs 1006.

According to an alternative embodiment the three-by-three array shown in FIG. 10, is replaced by a set of three elongated electrooptic devices each of which includes three separately controlled regions.

According to another alternative embodiment of the invention, the third reflective wall 110 of the electrooptic devices 100, 600, 700 is replaced by an absorbing wall, so that the electrooptic device 100 is a selective absorber.

The transmissive or reflective states of the electrooptic devices 100, 600, 700 can correspond to the natural pitch states of the liquid crystal layers 102, 104, 708, 710 of the electrooptic devices shown in FIGS. 1, 2, 6, 7, 8.

As used in this description the term light includes infrared, ultraviolet, and visible radiation.

According to an embodiment of the invention the electrooptic device 100 is a pixel of display that includes a plurality of such electrooptic devices 100. In such a display, one of each pair of electrodes used to establish an electric field 202, 204 is coupled to a row conductor, and the second of each aforementioned pair is coupled to a column electrode. Alternatively, an active display driver is used so that one of each aforementioned pair is coupled to ground and the second or each aforementioned pair is coupled to a switch (e.g., thin film transistor based switch) to which row and column conductors are coupled (e.g., one to source terminal and one to a gate terminal).

Although FIG. 1 shows separate pairs of electrodes for establishing the electric fields 202, 204 in the left 102 and right 104 handed liquid crystal layers, alternatively one field that extends into both liquid crystal layer is established by a single pair of electrodes, such as for example a single pair of interdigitated electrodes such as shown in FIG. 5.

Alternatively one or more of the electrodes used to establish electric fields in the liquid crystal layers (102, 104) are supported on the second transparent wall 108.

Although FIG. 1 shows a single signal source 130 coupled to all four electrodes 120, 122, 124, 126, alternatively separate voltages are applied between the first 120 and second 122 electrodes, and between the third 124 and fourth 126 electrodes.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. An electrooptic device comprising:
   a first cholesteric liquid crystal layer characterized by a first handedness and a first helical axis;
   a second cholesteric liquid crystal layer that is characterized by a second handedness that is opposite to the first handedness and a second helical axis; and
   a first set of one or more electrodes arranged so as to establish an electric field in at least the first cholesteric liquid crystal layer wherein the electric field is substantially perpendicular to the first helical axis.

2. The electrooptic device according to claim 1 wherein:
   the first set of one or more electrodes establishes an electric field in the second cholesteric liquid crystal layer wherein the electric field in the second cholesteric liquid crystal layer is substantially perpendicular to the second helical axis.

3. The electrooptic device according to claim 1 further comprising:
a second set of one or more electrodes for establishing an electric field in at least the second cholesteric liquid crystal layer.

4. The electrooptic device according to claim 1 wherein:
the electric field is characterized by a frequency; and
the first cholesteric liquid crystal layer is characterized by a positive anisotropy at the frequency.

5. The electrooptic device according to claim 1 wherein:
the first helical axis is substantially parallel to the second helical axis.

6. The electrooptic device according to claim 1 further comprising:
a first transmissive wall;
a second transmissive wall;
a third wall; wherein
the first cholesteric liquid crystal layer is disposed between the first transmissive wall and the second transmissive wall; and
the second cholesteric liquid crystal layer is disposed between the second transmissive wall and the third wall.

7. The electrooptic device according to claim 6 wherein:
the first set of one or more electrodes comprise:
a first electrode; and
a second electrode; and
wherein the first electrode and the second electrode are spaced apart; and
the first electrode and the second electrode are supported on the first wall.

8. An electrooptic device comprising:
a first cholesteric liquid crystal layer characterized by a first handedness;
a second cholesteric liquid crystal layer that is characterized by a second handedness that is opposite to the first handedness; and
one or more conductors for establishing a magnetic field in at least the first cholesteric liquid crystal layer.

9. An electrooptic device comprising:
a first cholesteric liquid crystal layer characterized by a first handedness;
a second cholesteric liquid crystal layer that is characterized by a second handedness that is opposite to the first handedness; and
a first means for altering a first helical pitch that characterizes the first cholesteric liquid crystal layer.

10. The electrooptic device according to claim 9 further comprising:
a second means for altering a second helical pitch that characterizes the second cholesteric liquid crystal layer.

11. The electrooptic device according to claim 10 wherein:
the first means and the second means are operated in unison so as to maintain equality of the first helical pitch and the second helical pitch.

12. An electrooptic system comprising:
an electrooptic device including:
a first cholesteric liquid crystal layer characterized by a first handedness and a helical axis;
a second cholesteric liquid crystal layer that is characterized by a second handedness that is opposite to the first handedness; and
one or more first electrodes for establishing an electric field in at least the first cholesteric liquid crystal layer that is substantially perpendicular to the helical axis; and
a signal source coupled to the one or more electrodes for supplying a voltage signal for establishing the electric field.

13. A method of modulating light comprising the steps of:
passing a pencil of light into a left handed cholesteric liquid crystal layer;
passing the pencil of light into a right handed cholesteric liquid crystal layer;
applying a field to the left handed cholesteric liquid crystal layer, and the right handed cholesteric liquid crystal layer wherein the field includes a substantial component perpendicular to a helical axis of the left handed cholesteric layer, and a helical axis of the right handed cholesteric layer.

14. An optical cross connect comprising:
an optical input adapted to emanate a light signal;
a selectively reflective optical element comprising:
a first cholesteric liquid crystal layer characterized by a first handedness;
a second cholesteric liquid crystal layer that is characterized by a second handedness that is opposite to the first handedness; and
one or more electrodes for establishing an electric field in at least the first cholesteric liquid crystal layer;
wherein the selectively reflective optical element is arranged to intercept the light signal emanated from the optical input at an angle;
a first optical output positioned so as to intercept the light signal in a first case that the light signal is transmitted through the selectively reflective optical element;
a second optical output positioned to intercept the light signal in a second case that the light signal is reflected from the selectively reflective optical element.

15. The optical cross connect according to claim 14 further comprising:
a signal source coupled to the one or more electrodes for supplying a voltage signal to establish the electric field.

16. The optical cross connect according to claim 14 wherein:
the first cholesteric liquid crystal layer is characterized by a helical axis;
the one or more electrodes are arranged to establish and electric field that includes a substantial electric field component perpendicular to the helical axis.

* * * * *